Patented Aug. 8, 1950

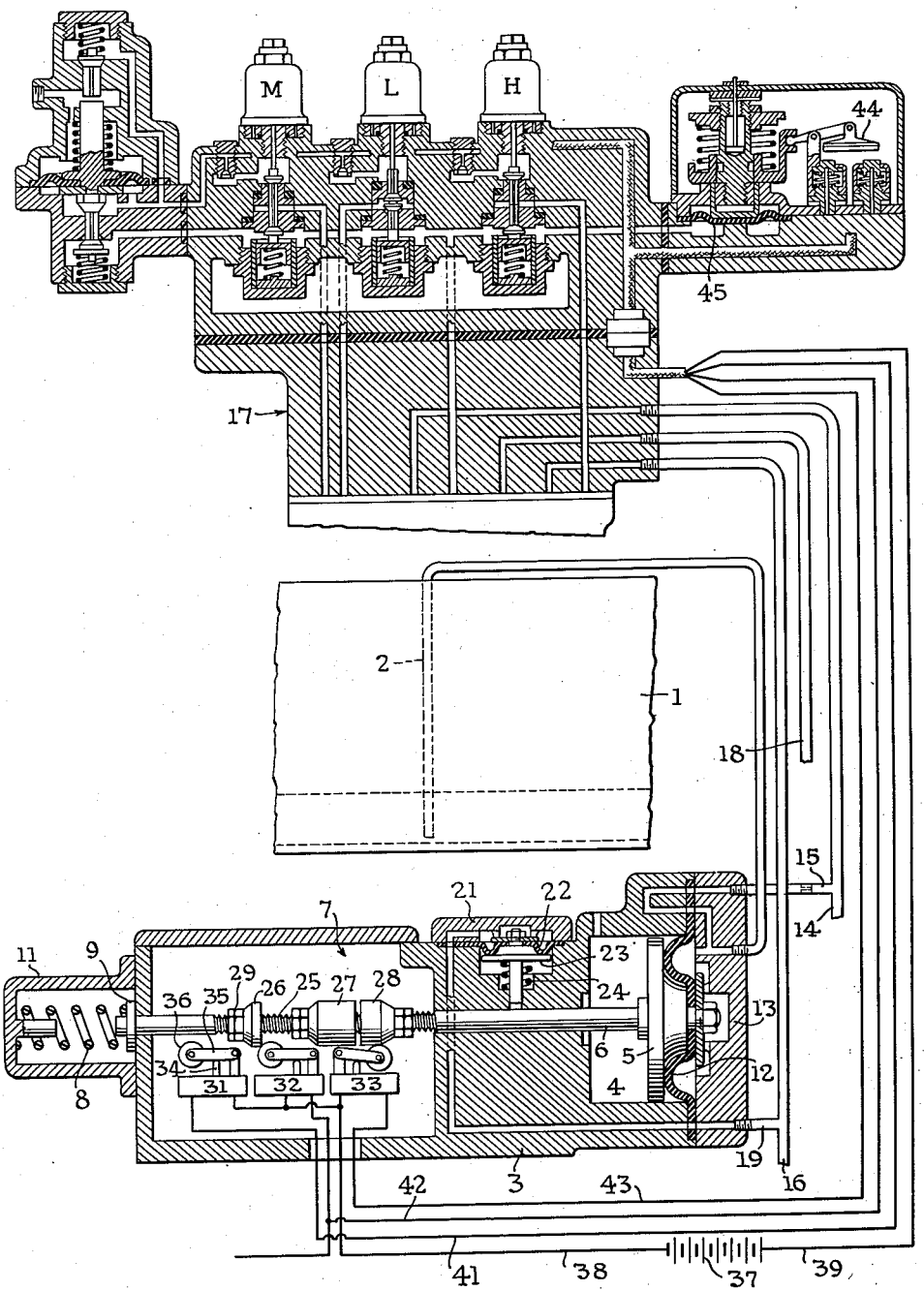

2,517,885

UNITED STATES PATENT OFFICE 2,517,885

VARIABLE LOAD BRAKE

William Frederick Klein, Watertown, N. Y., assignor to The New York Air Brake Company, a corporation of New Jersey Application March 10, 1947, Serial No. 733,661

4 Claims. (Cl. 303—22)

This invention relates to variable load brakes for railway vehicles, such as tank cars, locomotive tenders and the like in which liquid is the main and sometimes the sole factor in load variations.

In the patent to Campbell 2,178,927, Nov. 7, 1939, there is disclosed a variable load brake of this general class in which liquid level in the tank affects the control mechanism of a multi-ratio relay, interposed between the brake-controlling valve device and the brake cylinder. The control is mechanical and not readily adaptable to a variety of tanks regardless of their form and dimension. These factors greatly affect the relation between liquid depth and total weight of liquid and there is need for a versatile control mechanism.

The present invention provides a control for a multi-ratio relay (a four ratio relay is disclosed by way of example), capable of ready adjustment to the relation between liquid depth and total load for any particular installation. The control is by trigger actuated electric switches triggered by cams moved by a pressure motor which in turn is subject to hydrostatic pressure. The relay is a standard type used in the air brake art for other purposes. Thus very little special apparatus is required. Adjustment is made by means which determine the trip points of the switches. This is a positional adjustment affecting the relative positions of the switch trigger and the coacting triggering cam element. In the illustrated embodiment the cam elements rather than the switch triggers are adjustable, but this a matter of choice.

The invention will now be described by reference to the accompanying drawing in which the single figure is a view largely in diagram in which the switch controller and portions of the relay are shown in section.

The tank portion of a vehicle is shown at 1 (drawn in miniature as compared to the remainder of the figure) and 2 is a dip pipe open at its lower end and extending downward nearly to the bottom of the tank. Air at a pressure at least as high as the static head of liquid in the tank when full is fed at a restricted rate to the dip pipe. Thus the pipe is always under a pneumatic pressure proportional to the depth of liquid in the tank.

The load sensing device comprises a body 3 in which is formed a cylinder 4. In this cylinder a piston 5 may reciprocate. Piston 5 is fixed on a rod 6 which is guided in body 3, extends across a switch chamber 7 and reacts against coil compression spring 8. The spring is confined between a collar 9 on the rod and a cup-shaped cap 11 attached to body 3.

To seal the piston 5 against leakage it is attached at its center to the center of a slack diaphragm 12 and the margin of the diaphragm is clamped between body 3 and a cap 13 which closes the end of cylinder 4.

The main reservoir pipe 14 leads from the main reservoir of the brake system and has a restricted branch 15 which leads through cap 13 to the space within cylinder 4 at the right of piston 5 and also to dip pipe 2. As a consequence the right-hand face of piston 5 is subject to the variable pressure in dip pipe 2 and this, as has been explained, is proportional to the depth of liquid in the tank.

The pipe 16 leads from any suitable brake-controlling valve device (not shown) to the relay generally indicated at 17. Pipe 16 is at atmospheric pressure when the brakes are released. When they are applied the pipe is under a pressure controlled by the brake controlling valve device. The latter could be a straight air valve, an AB valve, or a D22 control valve, to name a few examples. The pipe 18 leads from the relay to the brake cylinder (not shown). A branch 19 leads from pipe 16 through body 3 and cap 21 to the space above a diaphragm 22. Diaphragm 22 when subjected to pressure reacts downward on the head of a latch member 23, which is biased in a releasing direction by spring 24.

When a brake application is made pipe 16, which normally is vented, is put under pressure of an intensity appropriate to the application and latch 23 engages rod 6 to fix its position during the application. Consequently surges of liquid such as may ensue from the brake application do not affect the setting of the load-sensing device.

A portion of rod 6, where it extends across chamber 7, is threaded as indicated at 25. On this threaded portion are threaded three cams 26, 27, 28, each of generally cylindrical form and each having a conical end. Each cam is locked in its adjusted positions by a corresponding check nut. The check nut for cam 26 appears at 29. The other are similar and are clearly shown in the drawing.

Mounted in chamber 7 are three identical electric switches 31, 32, 33. These are of any sensitive snap action type, and as here used are biased to open. Each is actuated to close by depressing a plunger such as the plunger 34 shown on switch 31. Depression is effected by a trigger arm 35 hinged to the switch casing and carrying a roller 36 in the path of the corresponding cam. In the case of switch 31 this is cam 26. The trigger mechanisms for switches 32 and 33 are identical with that for switch 31 and are clearly shown.

Switches in which the necessary motion of plunger 34 is less than 0.01 inch are available and can be used. These switches are small, and this fact permits the housing 3 and its contained apparatus to be small and light.

The relay generally indicated at 17 is what is known throughout the air brake industry as an FS-1864 Relay Valve. A commercial form of it is illustrated in the patent to Vroman 2,351,724 issued June 20, 1944, and is there described in detail. The point material to the present invention is that it is controlled by selective energization of three solenoids M, L and H. The switches 31, 32 and 33 perform this duty.

A source of current is illustrated as a battery at 37. A line 38 connects one terminal of the battery to one terminal of each switch (31, 32, 33). A line 39 connects the other terminal of the battery with one terminal of each solenoid of the solenoids M, L and H. Line 41 connects the other terminal of switch 31 with the remaining terminal of solenoid H. Line 42 connects switch 32 and the other terminal of solenoid M. Line 43 connects switch 33 and the other terminal of solenoid L.

Under no-load conditions, illustrated in the drawing, switch 33 alone is closed and solenoid L alone can be energized. Under such conditions a relay of the FS-1864 type reduces the braking ratio to 40%.

As the liquid level rises piston 5 is forced to the left. The next phase is when all switches 31, 32, 33 are open so none of the three solenoids can be energized. The corresponding braking ratio is 60%. Further motion to the left closes switch 32 energizing solenoid M only and establishing conditions for a braking ratio of 80%. At the limit of leftward motion (full load) switches 31 and 32 are closed so H and M can be energized giving 100% braking ratio.

Adjustment of the cams permits coordination of the switch actions with actual loads corresponding to the liquid levels. The pneumatic switch 44 controls line 39, and closes only when line 16 is under pressure, so that the circuits are energized only during applications. Diaphragm 45 is the means used to close switch 44.

The relay 17 is illustrated as one known device for controlling braking ratio, but any equivalent means controllable by control of a plurality of circuits might be substituted. The most important aspects of the invention are the possibility of adjusting the device so that chosen switches shall close at almost any chosen liquid depth, the use of miniature switches to control the circuits, and the dip pipe arrangement which permits the switch actuator and switches to be located at a point quite remote from the tank, so that they are accessible.

The above results can be had by the use of constructions different from those described. Modifications within the scope of the claims are contemplated.

What is claimed is:

1. In a variable load brake for tank vehicles, the combination of a variable ratio relay having controlling means comprising a plurality of electric windings whose selective energization conditions the relay to establish different braking ratios; a pressure motor; a spring serving to bias said motor to move in one direction; a dip pipe adapted to discharge air under pressure at a point near the bottom of liquid in the tank vehicle; means for supplying air under pressure to said pipe; a connection for subjecting said motor to pressure in said pipe acting on the motor in opposition to said spring; a source of electric current; a series of switches each controlling energization of a corresponding winding; and cam means actuated by said motor and arranged to actuate said switches in a definite order and at definite points in the motion of the motor.

2. The combination defined in claim 1 in which means are provided to adjust the points in the motion of the motor at which the various switches are actuated.

3. In a variable load brake for tank vehicles, the combination of a variable ratio relay having controlling means comprising a plurality of electric windings whose selective energization conditions the relay to establish different braking ratios; a pressure motor; a spring serving to bias said motor to move in one direction; a dip pipe adapted to discharge air under pressure at a point near the bottom of liquid in the tank vehicle; means for supplying air under pressure and at a restricted rate to said pipe; a connection for subjecting said motor to pressure in said pipe acting on the motor in opposition to said spring; a source of electric current; a series of switches each controlling energization of a corresponding winding from said source; a carrier arranged to be shifted in a definite path by said motor; a series of cams mounted in said carrier, and each adapted to actuate a corresponding one of said switches; and adjusting means for variably determining the points in the path of the carrier at which respective switches are actuated by their corresponding cams.

4. The combination defined in claim 3 in which the carrier is a longitudinally movable threaded rod, and the cams are in the form of generally cylindrical sleeves threaded on said rod and individually adjustable therealong by rotating each sleeve relatively to the rod.

WILLIAM FREDERICK KLEIN.

REFERENCES CITED

The following references are of record in the file of this patent:

UNITED STATES PATENTS

| Number | Name | Date |
|---|---|---|
| 2,178,927 | Campbell | Nov. 7, 1939 |
| 2,184,551 | Hewitt | Dec. 26, 1939 |
| 2,344,868 | Hewitt | Mar. 21, 1944 |